(12) United States Patent
Park

(10) Patent No.: US 7,975,869 B2
(45) Date of Patent: Jul. 12, 2011

(54) FUEL TANK ASSEMBLY WITH A BAFFLE PLATE

(75) Inventor: Jae Hwa Park, Incheon (KR)

(73) Assignee: Hyundai Motor Company, Seoul (KR)

( * ) Notice: Subject to any disclaimer, the term of this patent is extended or adjusted under 35 U.S.C. 154(b) by 705 days.

(21) Appl. No.: 11/203,441

(22) Filed: Aug. 12, 2005

(65) Prior Publication Data

US 2006/0032538 A1    Feb. 16, 2006

(30) Foreign Application Priority Data

Aug. 13, 2004  (KR) .................. 10-2004-0063704

(51) Int. Cl.
*B65D 88/12* (2006.01)
*B65D 90/52* (2006.01)

(52) U.S. Cl. ........ 220/563; 137/574; 137/590; 181/264; 220/501; 220/734

(58) Field of Classification Search .................. 220/501, 220/562–564, 734; 137/574, 590; 181/264; 244/135 C See application file for complete search history.

(56) References Cited

U.S. PATENT DOCUMENTS

| | | | | |
|---|---|---|---|---|
| 511,798 A | * | 1/1894 | Rankine | 210/130 |
| 1,691,979 A | * | 11/1928 | Lochen | 138/38 |
| 2,078,524 A | * | 4/1937 | Ashton et al. | 210/357 |
| 2,137,556 A | * | 11/1938 | Young | 210/442 |
| 2,262,526 A | * | 11/1941 | Beare et al. | 123/196 A |
| 2,374,332 A | * | 4/1945 | Crawford | 220/560.02 |
| 2,392,901 A | * | 1/1946 | Brown | 210/416.5 |
| 2,651,418 A | * | 9/1953 | Prendergast | 210/332 |
| 2,707,563 A | * | 5/1955 | Kasten et al. | 210/301 |
| 2,710,505 A | * | 6/1955 | Magill | 405/28 |
| 2,767,851 A | * | 10/1956 | Muller | 210/90 |
| 2,806,622 A | * | 9/1957 | Leirer | 220/4.14 |
| 2,860,809 A | * | 11/1958 | Perry | 220/563 |
| 3,045,981 A | * | 7/1962 | Hendrickson | 165/82 |
| 3,214,023 A | * | 10/1965 | Donner | 210/172.2 |
| 3,356,218 A | * | 12/1967 | Grudoski | 210/167.28 |
| 3,368,680 A | * | 2/1968 | Bozek | 210/90 |

(Continued)

FOREIGN PATENT DOCUMENTS

DE    28 30 443    2/1979

(Continued)

OTHER PUBLICATIONS

JP10089180A Translation; 1120344—Translation_JP10089180A.*

*Primary Examiner* — Anthony Stashick
*Assistant Examiner* — Ned A Walker
(74) *Attorney, Agent, or Firm* — Morgan, Lewis & Bockius LLP

(57) ABSTRACT

A fuel tank assembly includes a baffle plate mounted under the upper part of the fuel tank to form a predetermined distance between the baffle plate and the fuel tank bottom. The fuel tank assembly includes a fuel tank, a baffle plate having an upper plate in which a penetration hole is formed and a side wall integrally formed at an edge of the upper plate. A bracket mounts the fuel tank and the baffle plate, wherein, the upper plate and the side wall of the baffle plate are mounted to the fuel tank and have a predetermined distance therebetween.

11 Claims, 4 Drawing Sheets

U.S. PATENT DOCUMENTS

| | | | | |
|---|---|---|---|---|
| 3,414,129 | A | * | 12/1968 | Going et al. .................. 210/798 |
| 3,572,508 | A | * | 3/1971 | Rice ............................... 210/130 |
| 3,610,457 | A | * | 10/1971 | Opalewski .................... 220/563 |
| 3,747,761 | A | * | 7/1973 | Heinrich, Jr. ................. 210/120 |
| 3,750,888 | A | * | 8/1973 | Rinaldo ..................... 210/172.6 |
| 3,853,763 | A | * | 12/1974 | Hall ............................... 210/130 |
| 3,855,128 | A | * | 12/1974 | Shaltz et al. .................. 210/130 |
| 3,905,505 | A | * | 9/1975 | Gallay .......................... 220/563 |
| 3,928,201 | A | * | 12/1975 | Junck et al. ................... 210/132 |
| 3,959,141 | A | * | 5/1976 | Johnson ....................... 210/132 |
| 3,970,557 | A | * | 7/1976 | Shoup ........................... 210/130 |
| 4,179,036 | A | | 12/1979 | Pasini |
| 4,251,374 | A | * | 2/1981 | Cunningham ................ 210/232 |
| 4,385,913 | A | * | 5/1983 | Lane ............................... 96/130 |
| 4,388,196 | A | * | 6/1983 | Lucia ............................ 210/742 |
| 4,401,563 | A | * | 8/1983 | Koelfgen ...................... 210/130 |
| 4,458,665 | A | * | 7/1984 | Vandervaart ................. 126/101 |
| 4,575,422 | A | * | 3/1986 | Zimmer ........................ 210/130 |
| 4,643,249 | A | * | 2/1987 | Grawey ......................... 165/159 |
| 4,796,773 | A | * | 1/1989 | Gerhard ........................ 220/563 |
| 4,858,778 | A | * | 8/1989 | Patrick .......................... 220/562 |
| 4,863,055 | A | * | 9/1989 | Bietz ............................. 220/563 |
| 4,869,820 | A | * | 9/1989 | Yee ............................... 210/316 |
| 4,935,128 | A | * | 6/1990 | Hoeptner, III ............... 210/130 |
| 5,031,795 | A | | 7/1991 | Kotera et al. |
| 5,356,535 | A | * | 10/1994 | Ueno et al. ................. 210/416.5 |
| 5,462,678 | A | * | 10/1995 | Rosaen ......................... 210/798 |
| 5,481,876 | A | * | 1/1996 | Bay et al. ....................... 60/454 |
| 5,600,954 | A | * | 2/1997 | Bay et al. ....................... 60/454 |
| 5,662,722 | A | * | 9/1997 | Shiban ............................ 55/413 |
| 5,779,092 | A | * | 7/1998 | Hehn et al. ................... 220/563 |
| 5,795,472 | A | * | 8/1998 | Nurse, Jr. ...................... 210/232 |
| 5,906,221 | A | * | 5/1999 | Mancell ........................ 137/549 |
| 6,014,987 | A | * | 1/2000 | List et al. ..................... 137/549 |
| 6,280,614 | B1 | * | 8/2001 | Berg et al. ................ 210/170.08 |
| 6,345,721 | B1 | * | 2/2002 | Durre et al. ................... 210/440 |
| 6,475,380 | B1 | * | 11/2002 | Fangmann et al. ........... 210/120 |
| 6,558,535 | B2 | * | 5/2003 | Berg et al. ................ 210/170.08 |
| 6,612,458 | B2 | * | 9/2003 | Balzer et al. .................. 220/562 |
| 6,739,319 | B2 | * | 5/2004 | Braun et al. .................. 123/509 |
| 6,966,401 | B2 | * | 11/2005 | Kojima ......................... 181/233 |
| 2001/0019026 | A1 | * | 9/2001 | Berg et al. .................... 210/170 |
| 2002/0179611 | A1 | * | 12/2002 | Hagenbuch ................... 220/563 |
| 2003/0015537 | A1 | * | 1/2003 | Konja ........................... 220/563 |
| 2004/0126258 | A1 | * | 7/2004 | Lai et al. ...................... 418/55.1 |
| 2004/0166008 | A1 | * | 8/2004 | Lai et al. ...................... 418/55.1 |

FOREIGN PATENT DOCUMENTS

| | | | |
|---|---|---|---|
| DE | 19610154 | | 9/1997 |
| DE | 10055660 A1 | * | 5/2002 |
| JP | 54-167812 I | | 11/1979 |
| JP | 59114488 A | * | 7/1984 |
| JP | 61089824 A | * | 5/1986 |
| JP | 61226334 | | 10/1986 |
| JP | 01074119 A | * | 3/1989 |
| JP | 64-55125 U | | 4/1989 |
| JP | 2-132842 U | | 11/1990 |
| JP | 4-76526 U | | 7/1992 |
| JP | 10089180 A | * | 4/1998 |
| JP | 2000203281 A | * | 7/2000 |
| KR | 2003025335 A | * | 3/2003 |
| KR | 2003039134 A | * | 5/2003 |

* cited by examiner

FUEL TANK ASSEMBLY WITH A BAFFLE PLATE

CROSS-REFERENCE TO RELATED APPLICATION

This application claims priority to and the benefit of Korean Patent Application no. 10-2004-0063704 filed in the Korean Intellectual Property Office on Aug. 13, 2004, the entire content of which is incorporated herein by reference.

FIELD OF THE INVENTION

The present invention relates to a fuel tank assembly having a baffle plate. More particularly, the baffle plate is mounted under an upper part of the fuel tank to define a predetermined distance.

BACKGROUND OF THE INVENTION

Generally, a fuel tank of a vehicle is a container for housing fuel that is used for driving an engine. A conventional fuel tank is made of a thin metal with a thickness of typically about 1 mm. The inside structure of the conventional fuel tank includes a baffle plate horizontally or vertically fixed within the fuel tank. The baffle plate is intended to function to prevent a fuel surge. In addition, a plurality of holes are formed in the baffle plate so as to allow fuel to pass the baffle plate. Typical baffle plates are made of metal material, and installed on the inner surface of the fuel tank with a spot welding, or the like.

The baffle plate provided in the fuel tank prevents a fuel surge caused by an incline of the vehicle or an abrupt turn of the vehicle. In this regard, the fuel can be stably supplied to a fuel pump and a noise caused by fuel surge can be reduced.

However, although the baffle plate is mounted in the fuel tank as described above, the conventional fuel tank assembly, including the baffle plate and the fuel tank, has a limitation to continuously reducing the noise caused by fuel surge. Therefore, attempts to modify a shape, a size, and a mounting position of the baffle plate in the designing step of fuel tank to overcome the above described problem. However, a satisfactory result is not accomplished or if it is accomplished it is costly and time consuming. In addition, attempts to modify an interior shape of the fuel tank, instead of modifying a shape of the baffle plate, to reduce a noise caused by fuel surge in the fuel tank are often unsuccessful for similar reasons.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a fuel tank assembly having advantages of effectively suppressing fuel surge and reducing the number of elements composing the fuel tank assembly and, thereby, reducing manufacturing costs of the fuel tank.

An exemplary fuel tank assembly according to an embodiment of the present invention includes a fuel tank, a baffle plate having an upper plate in which a penetration hole is formed and a side wall integrally formed at an edge of the upper plate. A bracket mounts the fuel tank and the baffle plate. The upper plate and the side wall of the baffle plate is mounted to the fuel tank to have a predetermined distance therebetween.

According to a preferred embodiment, a connecting part 37 of the upper plate and the side wall may be rounded. A fuel pump mounting space may be formed in the upper plate of the baffle plate. The bracket can be mounted to the fuel tank by welding and the bracket is connected to the baffle plate with a bolt. A flange may be formed at an end of the bracket and the flange is mounted to an interior surface of the fuel tank or an exterior surface of the baffle plate via welding.

The bracket may be mounted to the baffle plate with an insert molding. The fuel tank assembly may further include a partition formed under the upper plate of the baffle plate. A shape of the interior surface of the fuel tank may be formed to correspond to a shape of an exterior surface of the fuel tank.

BRIEF DESCRIPTION OF THE DRAWINGS

The accompanying drawings illustrate exemplary embodiments of the present invention, and, taken together with the description, serve to explain the principles of the present invention, wherein.

DETAILED DESCRIPTION OF THE EMBODIMENTS

Figure 1:
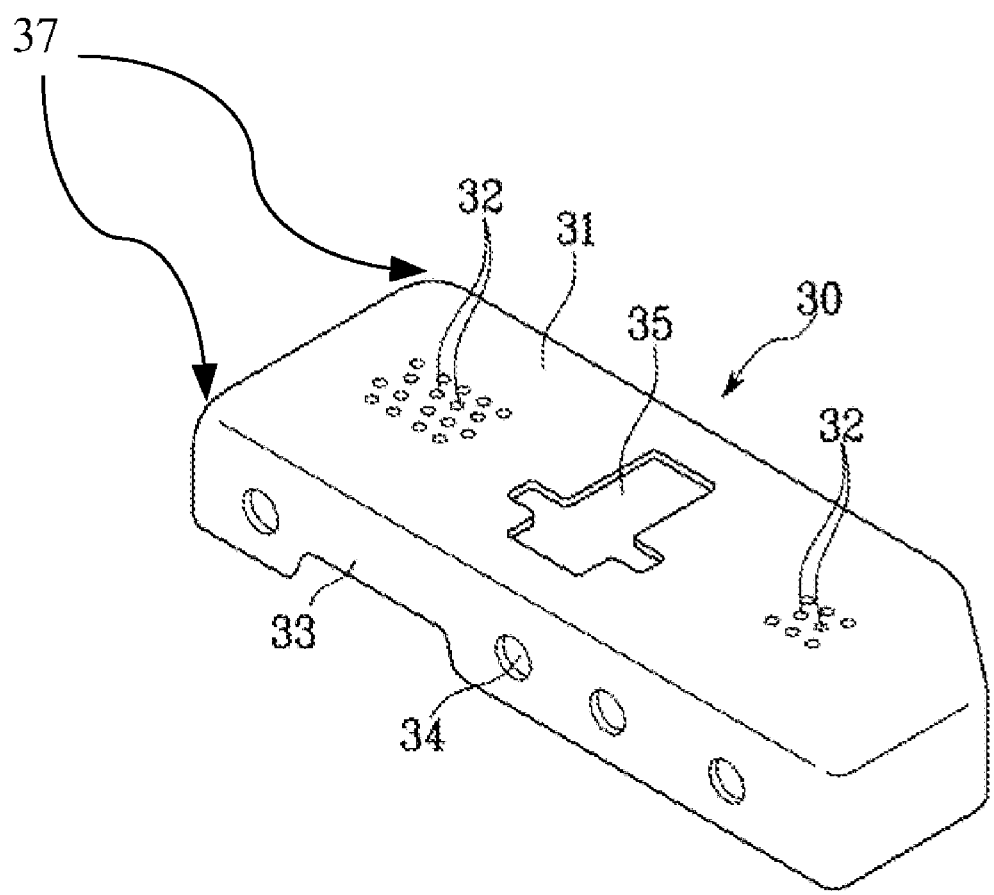
FIG. 1 is a perspective view of a baffle plate according to an embodiment of the present invention.
Figure 2:
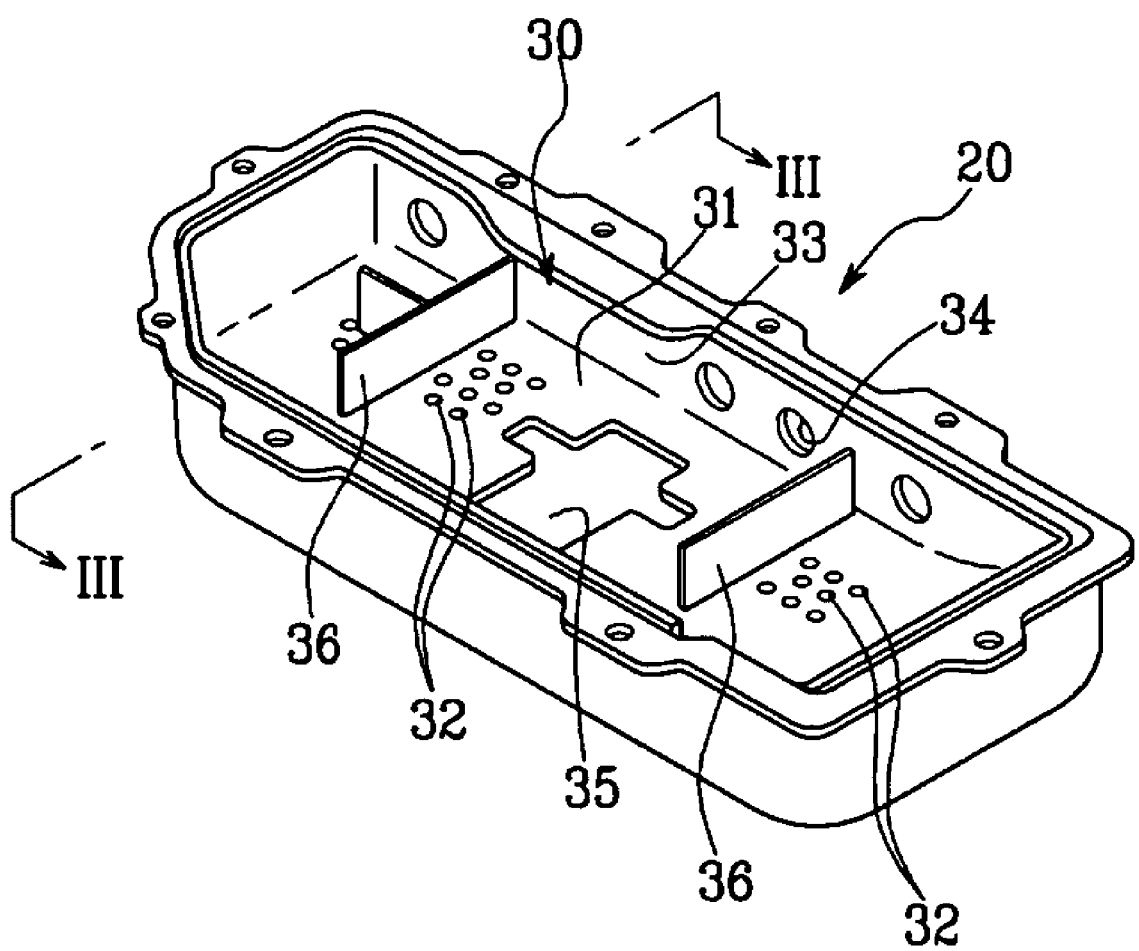
FIG. 2 is a perspective view of a fuel tank assembly where a baffle plate is provided in the fuel tank according to an embodiment of the present invention.
Figure 3:
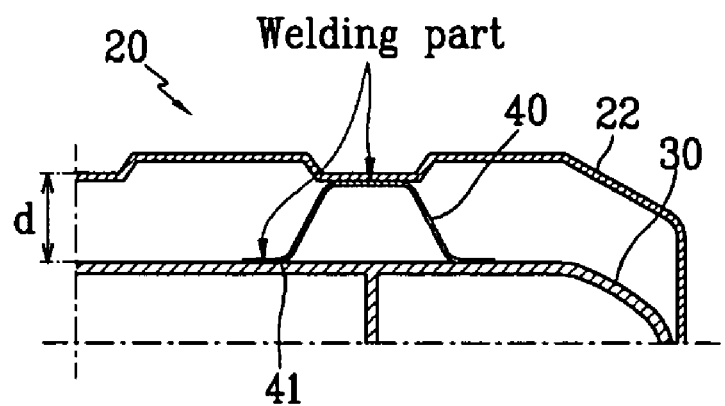
FIG. 3 is a partial sectional view taken along a line III-III of FIG. 2.

As shown in FIGS. 1-3, a baffle plate 30 is formed to have an exterior shape corresponding to the interior shape of an upper part 22 of a fuel tank 20. The baffle plate 30 is designed to be spaced apart from the upper part 22 of the fuel tank 20 by a predetermined distance (d). According to an embodiment the distance between the upper part 22 of the fuel tank 20 and the baffle plate 30 is between about 25 mm to about 35 mm.

The upper plate 31 of the baffle plate 30 may be made of synthetic resin having a predetermined rigidity, and has a plurality of penetration holes 32 formed therein, so as to allow the passage of fuel. The baffle plate 30 may be formed to have an exterior shape corresponding to the interior surface of the fuel tank 20. At an edge of the upper plate 31 of fuel tank 20, a side wall 33 is formed such that its bottom surface faces downward (downward with respect to the Figures). In the side wall 33, pressure controlling holes 34 may be formed to make pressures at the both side of the side wall 33 to be substantially equal. The pressure controlling holes 34 may have a greater diameter than the penetration hole 32.

In the center part of the baffle plate 30, a fuel pump mounting hole 35 is formed to secure the space for mounting various apparatuses relating to fuel supply, for example a fuel pump, a fuel sender, or the like. The fuel pump mounting hole 35 may be formed by penetrating the upper plate 31 of the baffle plate 30, and may be formed to have any shape.

Under the upper plate 31 of the baffle plate 30, a partition 36 may be further formed to effectively reduce a fuel surge. A size and shape of the partition 36 can be changed according to the design of the fuel tank 20 and the baffle plate 30, and a mounting position can be also changed according to the design of the fuel tank 20 and the baffle plate 30.

According to an embodiment, a bracket 40 is formed separately from or integrally to the baffle plate 30, so as to suspend the baffle plate 30 to the upper part 22 of the fuel tank 20.

Firstly, according to an exemplary embodiment of the present invention, a mounting structure of the baffle plate 30 and the fuel tank 20 with the bracket 40, which is preferably separately formed from the baffle plate 30, will be described hereinafter.

Referring to FIG. 3, the bracket 40 makes a predetermined distance (d) between the upper part 22 of the fuel tank 20 and baffle plate 30. The bracket 40 is separately formed to have a tapered shape gradually narrowing the width from a lower end to an upper end, and has a flange formed 41 at a lower end thereof. The bracket may be made of a metal material or any other suitable material for the conditions of the fuel used in the fuel tank 20. The upper end of the bracket 40 is mounted to the upper part 22 of the fuel tank 20 through, for example, spot welding, and the flange 41 at the lower end of the bracket 40 is also mounted to the baffle plate 30 through, for example, spot welding.

Figure 4:
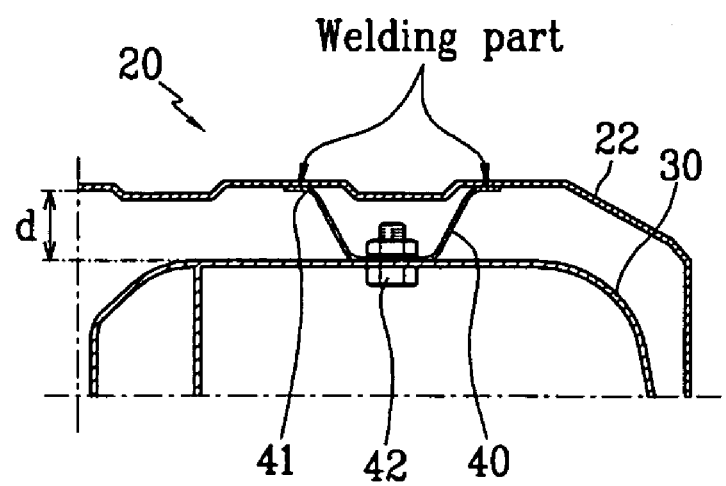
FIG. 4 is a sectional view of another embodiment of a fuel tank assembly taken along line III-III of FIG. 2 where a baffle plate is provided in the fuel tank according to another embodiment of the present invention.

Hereinafter, referring to FIG. 4, another embodiment of the mounting structure between the baffle plate 30 and the fuel tank 20, using the bracket 40 which is separately formed with the baffle plate 30, will be described. The bracket 40 makes a predetermined distance (d) between the upper part 22 of the fuel tank 20 and the baffle plate 30. The bracket 40 has a tapered shape gradually narrowing in width from the upper end to the lower end, and has a flange 41 formed at the upper end thereof. The bracket 40 may be made of a metal material or any other material suitable to the conditions of the internal of the fuel tank. The lower end of the bracket 40 is mounted to the baffle plate 30 with a bolt 42, for example, and the upper end of the bracket 40 is mounted to an upper part 22 of the fuel tank 20 with, for example, a spot welding.

Figure 5:
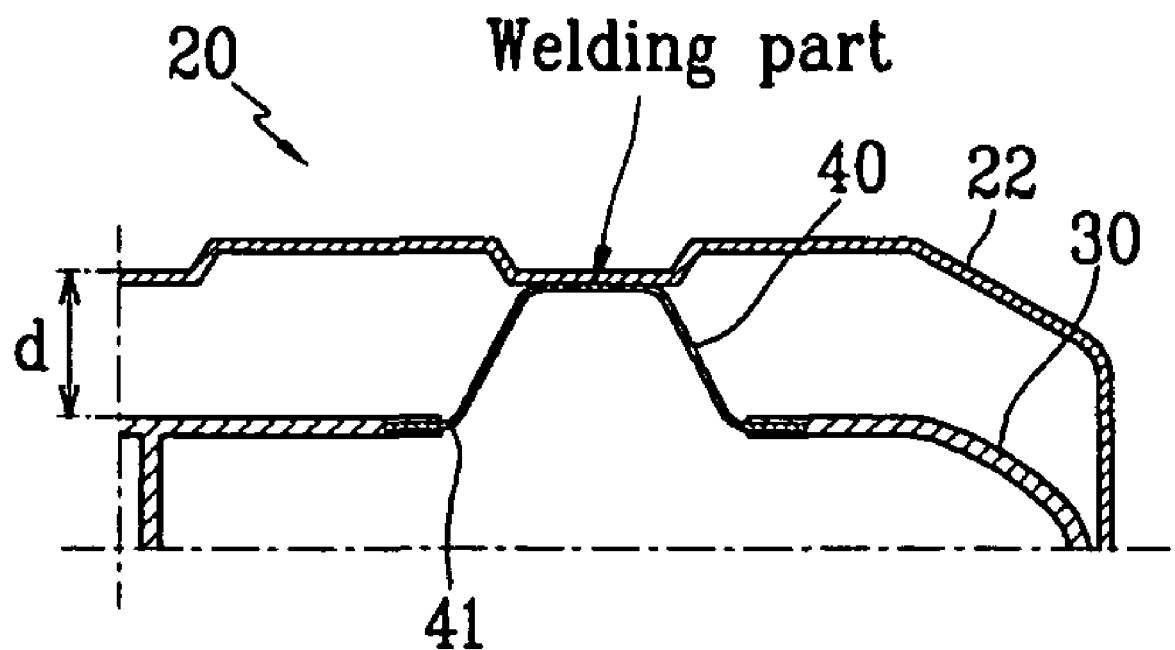
FIG. 5 is a sectional view of still another embodiment of a fuel tank assembly taken along line III-III of FIG. 2 where a baffle plate is provided in the fuel tank according to still another embodiment of the present invention.

Hereinafter, referring to FIG. 5, another exemplary embodiment of the mounting structure between the baffle plate 30 and the fuel tank 20, using the bracket 40 will be described. The bracket 40 makes a predetermined distance (d) between the upper part 22 of the fuel tank 20 and the baffle plate 30. According to this embodiment, the bracket 40 is separately formed to have a tapered shape gradually narrowing in width from the lower end to the upper end, and has a flange 41 formed at the lower end thereof. The bracket may be made of a metal material or any other suitable material. The lower end of the bracket 40 is provided to the baffle plate 30 using an insert molding, for example, and the upper end of the bracket 40 is mounted to the upper part 22 of the fuel tank 20 through, for example, spot welding.

Hereinafter, a function of the baffle plate 30 will be described in detail. Fuel contained in the fuel tank 20 is frequently surged during driving of the vehicle. A fuel surge occurs in various types, according to the amount of fuel in the fuel tank, a running state of the vehicle, etc., and results in various heights of the fuel surge wave. However, since the baffle plate 30, according to an embodiment of the present invention, is formed to be widely extended at the upper part of the fuel, an area to which the fuel contacts is wider than the conventional baffle plate, when the fuel surge occurs.

Although the baffle plate 30 is formed to have a size of covering almost all the area of the fuel tank 20, the fuel can exist on the baffle plate, since the baffle plate 30 has a plurality of penetrating holes 32 providing fluid communication between an upper space and the lower space of the baffle plate 30. Further, since the side wall 33 of the baffle plate 30 has a plurality of pressure controlling holes 34, there is little, if any, pressure difference between an inside and an outside of the baffle plate 30.

In addition, since the bracket 40 is interposed between the upper part 22 of the fuel tank 20 and the baffle plate 30 to make a predetermined distance therebetween, rigidity of the baffle plate 30 may be changed or increased with respect to the conventional baffle plate and the fuel surge may be suppressed. In addition, advantageous effects of the conventional baffle plate can be also achieved, with the partition 36 formed under the baffle plate 30.

According to the above-described fuel tank assembly according to embodiments of the present invention, since the baffle plate 30 is fixedly mounted to the fuel tank 20 by the bracket 40 to have a predetermined distance between the upper part 22 of the fuel tank 20 and the baffle plate 30, a fuel surge can be effectively suppressed. In addition, the number of elements composing the fuel tank assembly and the manufacturing cost can be reduced.

While this invention has been described in connection with what is presently considered to be the best practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel tank assembly comprising:
   a fuel tank;
   a baffle plate positioned in the fuel tank and having:
      an upper plate in which a penetration hole is formed, the upper plate positioned along and proximate to an upper interior wall of the fuel tank and substantially conforming to the upper interior wall;
      a side wall integrally formed along an outer edge of the upper plate wherein the side wall extends downwards from the upper plate away from the upper interior surface; and
      a partition formed under the upper plate in the baffle plate and spaced from the side wall; and
   a bracket connecting the baffle plate to the fuel tank,
   wherein the upper plate and the side wall of the baffle plate are disposed to be apart from the upper interior wall and a side wall of the fuel tank to form an upper space between the upper interior wall of the fuel tank and the upper plate of the baffle plate so that fluid-communication between the upper space and a lower space formed below the baffle plate is performed through the penetration hole.

2. The fuel tank assembly of claim 1, wherein a connecting part of the upper plate and the side wall is rounded.

3. The fuel tank assembly of claim 1, wherein a fuel pump mounting hole is formed in the upper plate of the baffle plate.

4. The fuel tank assembly of claim 1, wherein the bracket is welded to the fuel tank, and the bracket is connected to the baffle plate with a bolt.

5. The fuel tank assembly of claim 1, wherein a flange is formed at an end of the bracket, and the flange is welded to an interior surface of the fuel tank or an exterior surface of the baffle plate.

6. The fuel tank assembly of claim 1, wherein the bracket is mounted to the baffle plate through an insert molding.

7. The fuel tank assembly of claim 1, wherein a shape of an exterior surface of the baffle plate is formed to correspond to a shape of an interior surface of the fuel tank.

8. The fuel tank assembly of claim 1, wherein the upper space has a thickness between about 25 mm to about 35 mm.

9. The fuel tank assembly of claim 1, wherein a height of the partition is shorter than a height of the side wall of the baffle plate.

10. The fuel tank assembly of claim 1, wherein a pressure controlling hole is formed in the side wall of the baffle plate.

11. The fuel tank assembly of claim 10, wherein a diameter of the pressure controlling hole is greater than a diameter of the penetration hole.

* * * * *